(12) United States Patent
Amadon et al.

(10) Patent No.: US 10,557,364 B2
(45) Date of Patent: Feb. 11, 2020

(54) TWO PIECES STATOR INNER SHROUD

(71) Applicant: United Technologies Corporation, Farmington, CT (US)

(72) Inventors: Colin Amadon, Kennebunk, ME (US); Thomas Freeman, Kennebunk, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 435 days.

(21) Appl. No.: 15/358,858

(22) Filed: Nov. 22, 2016

(65) Prior Publication Data
US 2018/0230840 A1 Aug. 16, 2018

(51) Int. Cl.
*F01D 11/08* (2006.01)
*F01D 9/04* (2006.01)
*F01D 25/06* (2006.01)

(52) U.S. Cl.
CPC .............. *F01D 11/08* (2013.01); *F01D 9/041* (2013.01); *F01D 9/044* (2013.01); *F01D 25/06* (2013.01); *F05D 2240/11* (2013.01); *F05D 2250/182* (2013.01); *F05D 2250/70* (2013.01); *F05D 2300/431* (2013.01); *F05D 2300/437* (2013.01);
(Continued)

(58) Field of Classification Search
CPC .......... F01D 11/08; F01D 9/041; F01D 9/044; F01D 25/06; F05D 2240/11; F05D 2250/182; F05D 2250/70; F05D 2300/431; F05D 2300/437; F05D 2300/501; F05D 2300/603; Y02T 50/672

USPC ....................................................... 415/173.7
See application file for complete search history.

(56) References Cited

U.S. PATENT DOCUMENTS

| 1,717,203 | A | * | 6/1929 | Gottschalk | .............. F01D 9/042 |
| | | | | | 415/209.4 |
| 3,018,085 | A | * | 1/1962 | Welsh | ................... F01D 11/025 |
| | | | | | 415/136 |

(Continued)

FOREIGN PATENT DOCUMENTS

| EP | 0421596 | 4/1991 |
| EP | 2620591 | 7/2013 |
| WO | 20170149414 | 9/2017 |

OTHER PUBLICATIONS

European Patent Office, European Search Report dated Mar. 14, 2018 in Application No. 17195997.6-1006.
(Continued)

*Primary Examiner* — David Hamaoui
*Assistant Examiner* — John D Bailey
(74) *Attorney, Agent, or Firm* — Snell & Wilmer, L.L.P.

(57) ABSTRACT

An inner shroud segment may include an inner housing and an outer housing. The inner housing may have a radial curve centered relative to an axis with a radial wall and a bottom wall that define a first channel. The outer housing may have a first axial wall, a first circumferential wall, and a second axial wall that define a second channel. The outer housing may also be disposed within the first channel with the radial wall of the inner housing contacting the first axial wall, the first circumferential wall, and/or the second axial wall. A compliant material may be disposed within the second channel and coupled to the radial wall and the first axial wall, the first circumferential wall, and/or the second axial wall.

20 Claims, 5 Drawing Sheets

(52) U.S. Cl.
CPC .. *F05D 2300/501* (2013.01); *F05D 2300/603* (2013.01); *Y02T 50/672* (2013.01)

(56) References Cited

U.S. PATENT DOCUMENTS

| | | | | | |
|---|---|---|---|---|---|
| 4,285,633 | A | * | 8/1981 | Jones | F01D 11/001 |
| | | | | | 415/191 |
| 4,295,785 | A | * | 10/1981 | Lardellier | F01D 11/02 |
| | | | | | 277/414 |
| 4,395,195 | A | * | 7/1983 | De Cosmo | F01D 9/042 |
| | | | | | 415/137 |
| 4,767,267 | A | * | 8/1988 | Salt | F01D 11/001 |
| | | | | | 415/173.7 |
| 4,897,021 | A | * | 1/1990 | Chaplin | F01D 5/22 |
| | | | | | 267/160 |
| 5,073,084 | A | * | 12/1991 | Hirst | F01D 11/001 |
| | | | | | 16/224 |
| 5,586,864 | A | * | 12/1996 | Knorowski | F01D 9/044 |
| | | | | | 415/209.2 |
| 5,752,802 | A | * | 5/1998 | Jones | F01D 5/20 |
| | | | | | 415/170.1 |
| 7,635,251 | B2 | * | 12/2009 | Duesler | F01D 11/001 |
| | | | | | 415/160 |
| 8,240,043 | B2 | * | 8/2012 | Duesler | F01D 11/001 |
| | | | | | 29/412 |
| 9,416,672 | B2 | * | 8/2016 | Feldmann | F01D 9/041 |
| 2006/0083607 | A1 | * | 4/2006 | Synnott | F01D 11/08 |
| | | | | | 415/173.1 |
| 2007/0022738 | A1 | * | 2/2007 | Norris | F01D 5/022 |
| | | | | | 60/226.1 |
| 2009/0169386 | A1 | * | 7/2009 | Suciu | F01D 5/30 |
| | | | | | 416/189 |
| 2009/0208338 | A1 | * | 8/2009 | Major | F01D 11/001 |
| | | | | | 416/215 |
| 2010/0172742 | A1 | * | 7/2010 | Duesler | F01D 11/001 |
| | | | | | 415/119 |
| 2011/0135479 | A1 | * | 6/2011 | Ueda | F01D 5/16 |
| | | | | | 416/179 |
| 2013/0058756 | A1 | * | 3/2013 | Tham | F01D 11/001 |
| | | | | | 415/1 |
| 2013/0189092 | A1 | * | 7/2013 | Dube | F01D 5/16 |
| | | | | | 415/200 |
| 2013/0202422 | A1 | * | 8/2013 | Ikeguchi | F01D 25/24 |
| | | | | | 415/191 |
| 2014/0133989 | A1 | * | 5/2014 | Belmonte | F01D 9/02 |
| | | | | | 416/204 A |
| 2016/0153298 | A1 | | 6/2016 | Vatin | |
| 2016/0376901 | A1 | * | 12/2016 | O'Leary | F01D 11/005 |
| | | | | | 415/116 |

OTHER PUBLICATIONS

European Patent Office, European Search Report dated Mar. 4, 2019 in Application No. 17195997.6.

* cited by examiner

TWO PIECES STATOR INNER SHROUD

FIELD

The disclosure relates generally to stator shrouds for gas turbine engines.

BACKGROUND

Stator inner shrouds define the inner wall of the gas flow path in a gas turbine engine. The shrouds typically retain one end of a stator in place. Low pressure compressor shrouds may be formed from heavy and/or dense materials as temperature demands for the shrouds increase. Heavier materials result in an overall weight impact to the gas turbine engine and, ultimately, the aircraft powered by the engine.

SUMMARY

An inner shroud segment is provided. The inner shroud segment may include an inner housing and an outer housing. The inner housing may have a radial curve centered relative to an axis with a radial wall and a bottom wall that define a first channel. The outer housing may have a first axial wall, a first circumferential wall, and a second axial wall that define a second channel. The outer housing may also be disposed within the first channel with the radial wall of the inner housing contacting the first axial wall, the first circumferential wall, and/or the second axial wall. A compliant material may be disposed within the second channel and coupled to the radial wall and the first axial wall, the first circumferential wall, and/or the second axial wall.

In various embodiments, the outer housing may include a third axial wall defining a cavity between the third axial wall and the second axial wall. The cavity may be devoid of the compliant material. A vane may extend into the second channel and contact the compliant material. An exposed surface of the compliant material may be substantially coplanar with a surface of the outer housing. The inner housing may comprise a bent sheet of metal. The compliant material may retain the outer housing in position relative to the inner housing.

An inner shroud is also provided. The inner shroud may include one or more inner shroud segments with a radial curve centered about an axis. An inner shroud segment may include an inner housing and an outer housing disposed in the inner housing. The outer housing may define a channel facing away from the inner housing and a cavity facing towards the inner housing. A vane may be retained within the channel of the outer housing. A compliant material may be coupled to the vane, the inner housing, and the outer housing. The compliant material may thus retain the inner housing relative to the outer housing.

In various embodiments, the inner housing may have a radial wall and a bottom wall that define a channel of the inner housing. The outer housing may also have a first axial wall, a first circumferential wall, and a second axial wall that define the channel of the outer housing. The outer housing may be disposed within the channel of the inner housing. The radial wall of the inner housing may be in contact with the first axial wall, the first circumferential wall, and/or the second axial wall. The cavity may be devoid of the compliant material. An exposed surface of the compliant material may be substantially coplanar with a surface of the outer housing. The inner shroud segment may be made from sheet metal and/or composite material. The inner housing may comprise an axial wall in contact with a terminus wall of the outer housing. The terminus wall may be coplanar with a surface of the compliant material. The outer housing may also comprise a terminus wall oriented axially and contacting a bottom wall of the inner housing.

A gas turbine engine is also provided and may comprise a compressor section including a vane retained in an inner shroud segment. The inner shroud segment may include an inner housing and an outer housing disposed in the inner housing. The outer housing may define a channel facing away from the inner housing and a cavity facing towards the inner housing. The gas turbine engine may further include a combustor section aft of the compressor section and a turbine section aft of the compressor section and coupled to the compressor section by a shaft.

In various embodiments, the inner housing may include a radial wall and a bottom wall that define a channel of the inner housing. The outer housing may further include a first axial wall, a first circumferential wall, and a second axial wall that define the channel of the outer housing. The outer housing may be disposed within the channel of the inner housing with the radial wall of the inner housing contacting the first axial wall, the first circumferential wall, and/or the second axial wall. A compliant material may be coupled to the inner housing, the outer housing, and the vane. An exposed surface of the compliant material may be substantially coplanar with a surface of the outer housing. The inner shroud segment may be made from sheet metal.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
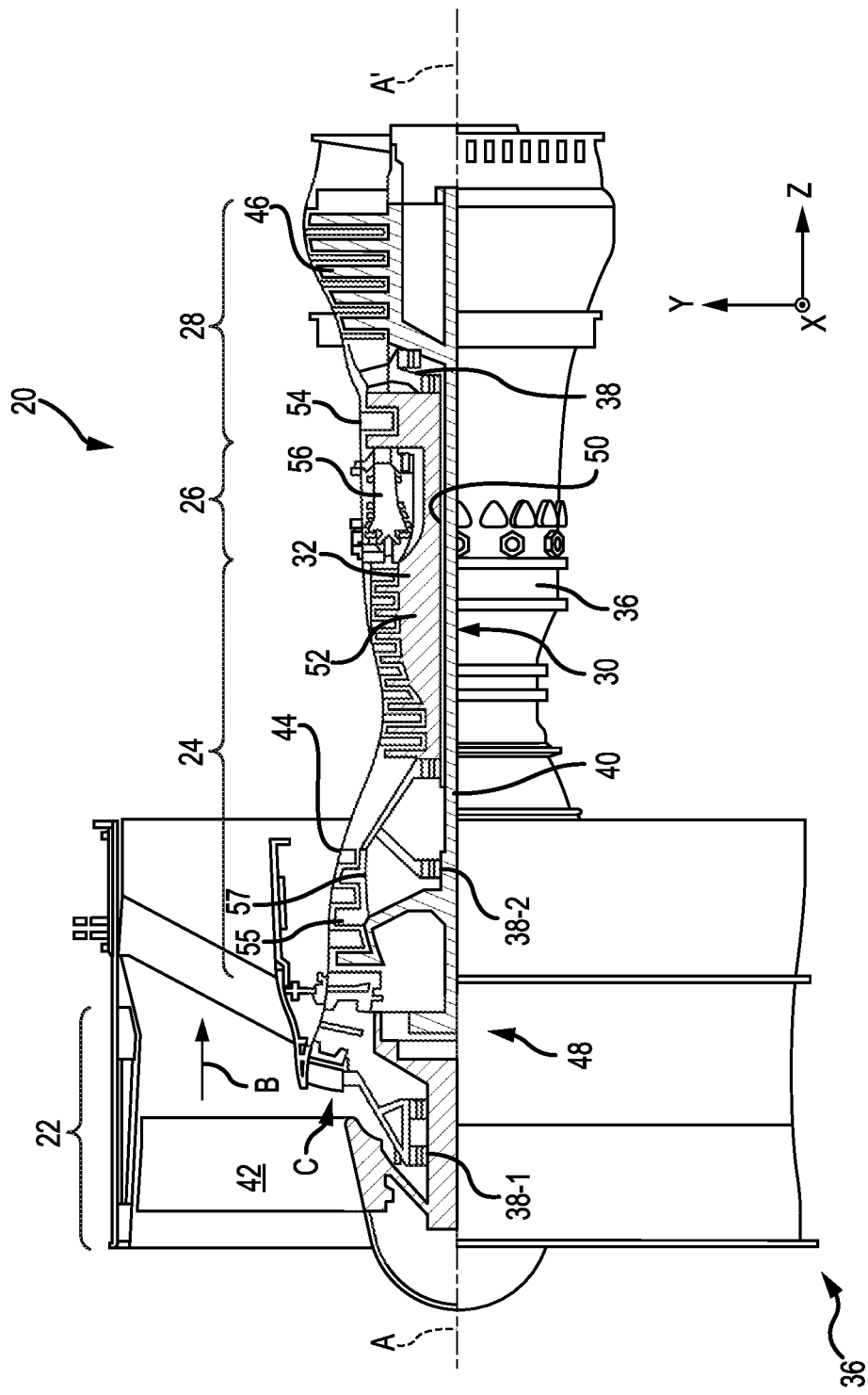
FIG. 1 illustrates an example of a gas turbine engine, in accordance with various embodiments.

Referring now to FIG. 1, an exemplary gas turbine engine 20 is shown, in accordance with various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive fluid air) along a bypass-flow path B while compressor section 24 can drive coolant along a core-flow path C for compression and communication into combustor section 26 then expansion through turbine section 28. Although depicted as a two-spool turbofan gas turbine engine 20 herein, it should be understood that the concepts described herein are not limited to use with two-spool turbofans as the teachings may be applied to other types of turbine engines including turbojet, turboprop, turboshaft, or power generation turbines, with or without geared fan, geared compressor or three-spool architectures.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low-pressure compressor 44 and a low-pressure turbine 46. Inner shaft 40 may be connected to fan 42 through a geared architecture 48 that can drive fan 42 at a lower speed than low speed spool 30. Geared architecture 48 may comprise a gear assembly enclosed within a gear housing that couples inner shaft 40 to a rotating fan structure. High speed spool 32 may comprise an outer shaft 50 that interconnects a high-pressure compressor 52 and high-pressure turbine 54. Airfoils 55 coupled to a rotor of high-pressure turbine may rotate about the engine central longitudinal axis A-A' or airfoils 55 coupled to a stator may be rotationally fixed about engine central longitudinal axis A-A'. Airfoils 55 coupled to a stator may be held in place by inner shroud 57.

A combustor 56 may be located between high-pressure compressor 52 and high-pressure turbine 54. Inner shaft 40 and outer shaft 50 may be concentric and rotate via bearing systems 38 about the engine central longitudinal axis A-A', which is collinear with their longitudinal axes. As used herein, a "high-pressure" compressor or turbine experiences a higher pressure than a corresponding "low-pressure" compressor or turbine.

The core airflow along core-flow path C may be compressed by low-pressure compressor 44 then high-pressure compressor 52, mixed and burned with fuel in combustor 56, then expanded over high-pressure turbine 54 and low-pressure turbine 46. Turbines 46, 54 rotationally drive the respective low speed spool 30 and high speed spool 32 in response to the expansion.

Figure 2A:
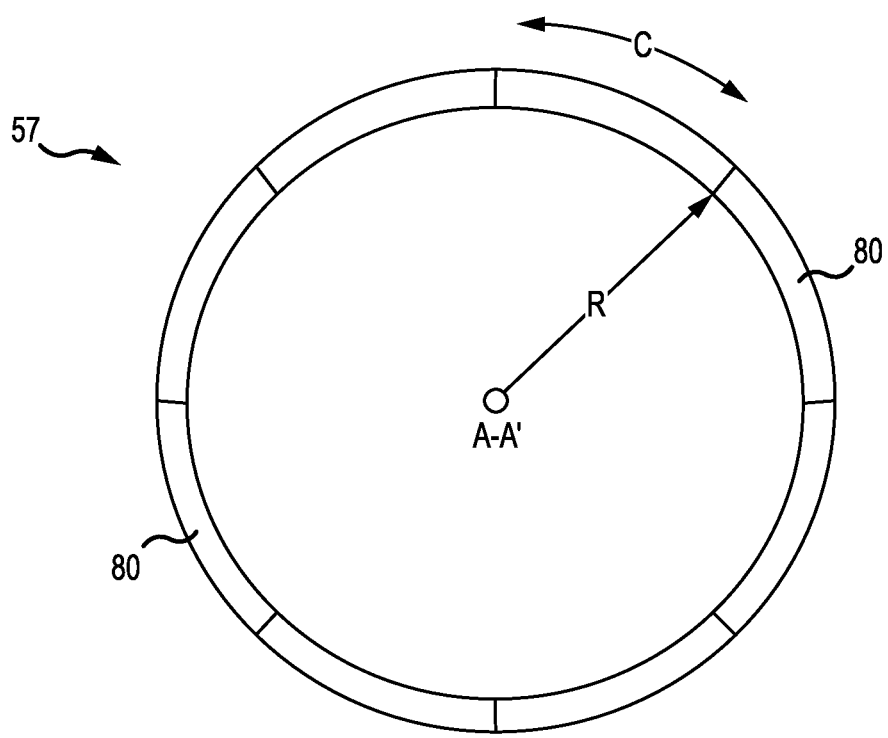
FIG. 2A illustrates an inner shroud comprising inner shroud segments as viewed in an axial direction, in accordance with various embodiments.

With reference to FIG. 2A, an inner shroud 57 having an annular geometry is shown, in accordance with various embodiments. Inner shroud 57 may comprise one or more inner shroud segments 80. Multiple inner shroud segments 80 may be aligned to form inner shroud 57 having annular geometry centered about axis A-A'. Each segment may have a radial curve of radius R along the circumferential direction C. A single inner shroud segment 80 may also form a continuous inner shroud 57 having annular geometry centered about axis A-A'. In that regard, inner shroud 57 may be divided into any number of inner shroud segments 80. Each shroud segment 80 may thus be an arc of inner shroud 57.

Figure 2B:
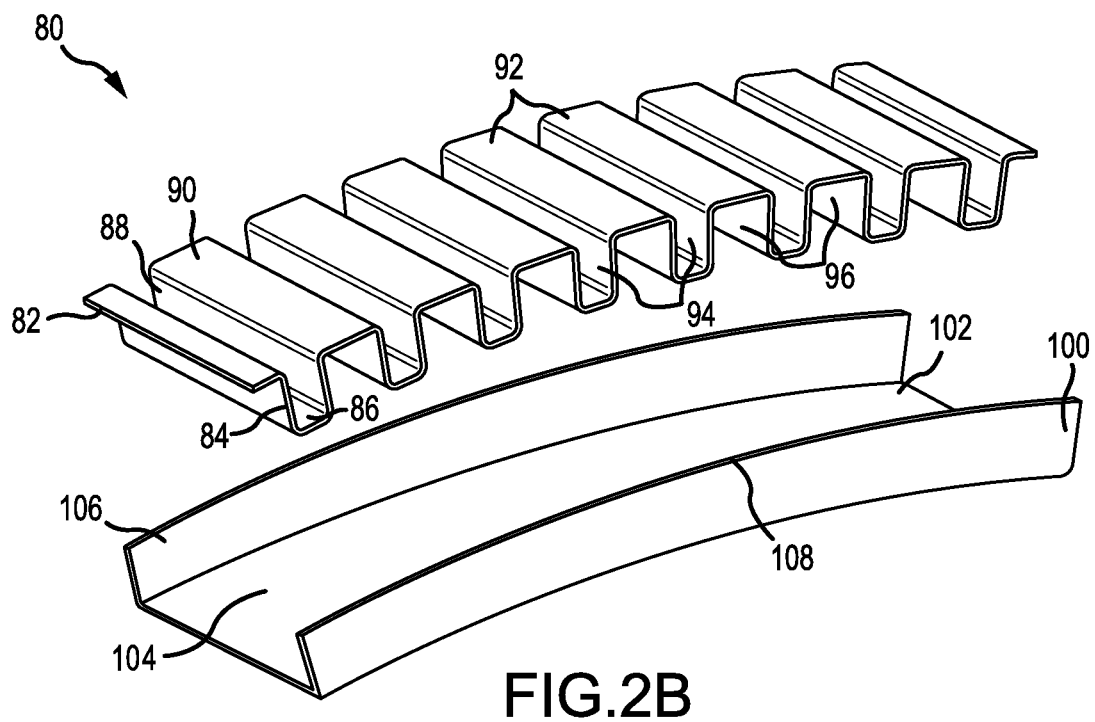
FIG. 2B illustrates an exploded perspective view of an inner shroud segment comprising an outer housing and inner housing, in accordance with various embodiments.

Referring now to FIGS. 2A and 2B, an inner shroud segment 80 is shown in an exploded perspective view, in accordance with various embodiments. Outer housing 82 may define several channels 94 extending in an axial direction. Each channel 94 may be defined between an axial wall 84, a circumferential wall 86, and another axial wall 88 of outer housing 82. Axial wall 88 may be joined to an axial wall 84 defining an adjacent channel by wall 92. Wall 92 may partially define a circumferential surface of flow path C of gas turbine engine 20 of FIG. 1. A cavity 96 may be defined between adjacent channels 94 by a axial wall 88, wall 92, and axial wall 84.

In various embodiments, outer housing 82 of inner shroud segment 80 may be formed from a continuous piece of material. Outer housing 82 may be formed from a continuous piece of sheet metal by cutting and bending the sheet metal. Suitable metals may include aluminum, titanium, nickel, steel, and alloys including any of the preceding metals. Outer housing 82 may also be formed from carbon fiber composite material by laying up a fibrous material, applying a resin, and curing the resin.

In various embodiments, inner shroud segment 80 may also include an inner housing 100. Inner housing 100 may have a "u-shaped" geometry. Inner housing 100 may include a bottom wall 102 that has a radial contour with radial walls 106 defining the axial boundaries of inner housing 100. Radial walls 106 may thus extend in a circumferential direction across the circumferential length of inner housing 100. Radial walls 106 and bottom wall 102 may define channel 104 that extends in a circumferential direction. Surface 108 of inner housing 100 may be a circumferential surface marking the radial terminus of radial walls 106.

In various embodiments, inner housing 100 of inner shroud segment 80 may be formed from a continuous piece of material. Inner housing 100 may be formed from a continuous piece of sheet metal by cutting and bending the sheet metal. Suitable metals may include aluminum, titanium, nickel, steel, and alloys including any of the preceding metals. Inner housing 100 may also be formed from carbon fiber composite material by laying up a fibrous material, applying a resin, and curing the resin.

Figure 2C:
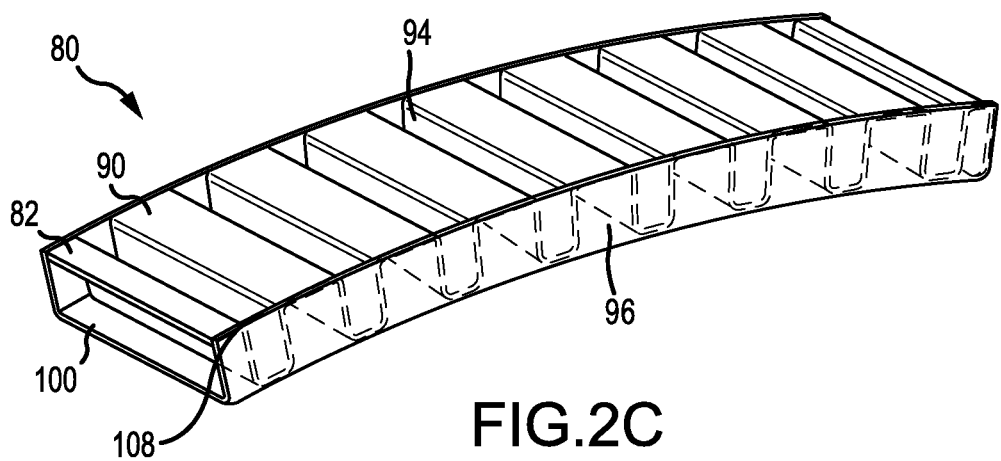
FIG. 2C illustrates a perspective view of an inner shroud segment with an outer housing inserted into an inner housing.

Referring now to FIGS. 2A to 2C, channel 104 may be configured to receive outer housing 82 to for inner shroud segment 80 in various embodiments. Outer housing 82 may be inserted into channel 104 of inner housing 100. Radial walls 106 of inner housing 100 may define the axial boundaries of channels 94. In that regard, the axial ends of radial wall 84, circumferential wall 86, and radial wall 88 of outer housing 82 may contact radial walls 106 of inner housing 100. Outer housing 82 may be retained within inner housing 100 with surface 90 of outer housing 82 being substantially flush with surface 108 of inner housing 100. Channels 94 of outer housing 82 may be directed radially outward and away from inner housing 100. Cavities 96 of outer housing 82 may be directed radially inward and towards inner housing 100. The circumferential lengths of inner housing and outer housing may be substantially similar such that a single outer housing 82 is mated with a single inner housing 100. The circumferential lengths of outer housing 82 and inner housing 100 may also be varied such that multiple outer housings 82 are mated with a single inner housing 100, or such that multiple inner housings 100 are mated with a single outer housing 82, for example.

Figure 2D:
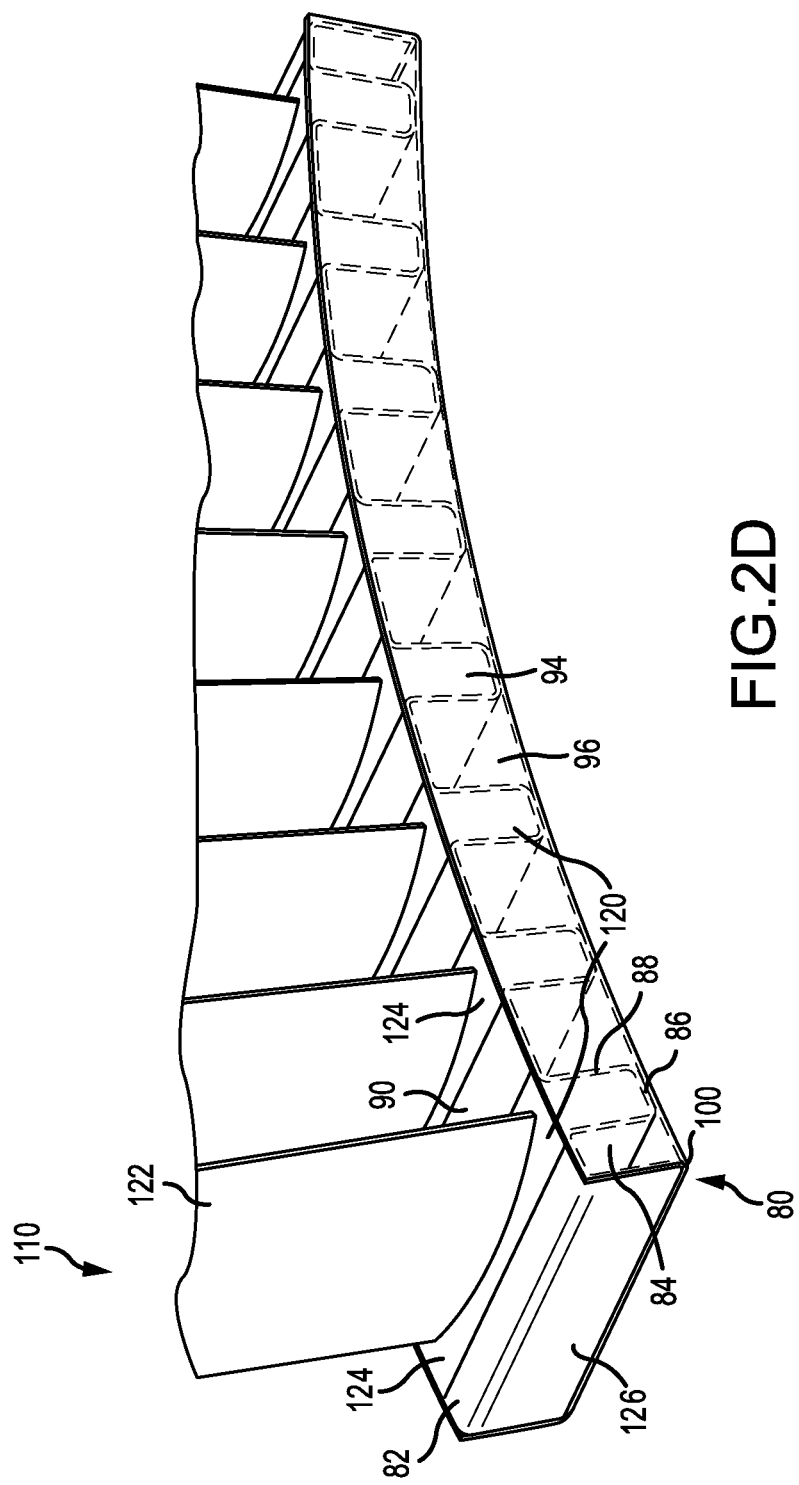
FIG. 2D illustrates a perspective view of an inner shroud segment with vanes inserted into cavities of the inner shroud segment and retained by compliant material, in accordance with various embodiments.

With reference to FIG. 2D, a shroud assembly 110 is shown, in accordance with various embodiments. Shroud assembly 110 may comprise inner shroud segment 80 having outer housing 82 inserted into inner housing 100. A vane 122 may be inserted into each channel 94 defined by inner housing 82. Compliant material 120 may be introduced into channel 94 to surround the portion of vane 122 extending into channel 94 and fill channel 94 with compliant material 120. Compliant material 120 may be introduced into channel 94 in a liquid state and subsequently cured in channel 94. Compliant material 120 may be, for example, rubber, synthetic rubber, silicone or other suitable compliant material. Surface 124 of compliant material 120 may be exposed from outer housing 82 and substantially coplanar with surface 90 of outer housing 82, with both surface 90 and surface 124 partially defining flow path C of gas turbine engine 20 in FIG. 1.

In various embodiments, rubber may be injected into channels 94 to fill cavity 94 channels 94 with compliant material 120. Compliant material 120 may also be smoothed along surface 124 before, during, and/or after curing the rubber. Compliant material 120 may adhere to wall 84, wall 86, wall 88, and radial walls 106 to fix outer housing 82 in position relative to inner housing 100. Cavity 96 may remain substantially devoid of rubber to reduce the weight of inner shroud segment 80. Outer housing 82 may include a terminus wall 126 corresponding to the circumferential end of inner shroud segment 80 and in contact with the bottom wall of inner housing 100.

Figure 3A:
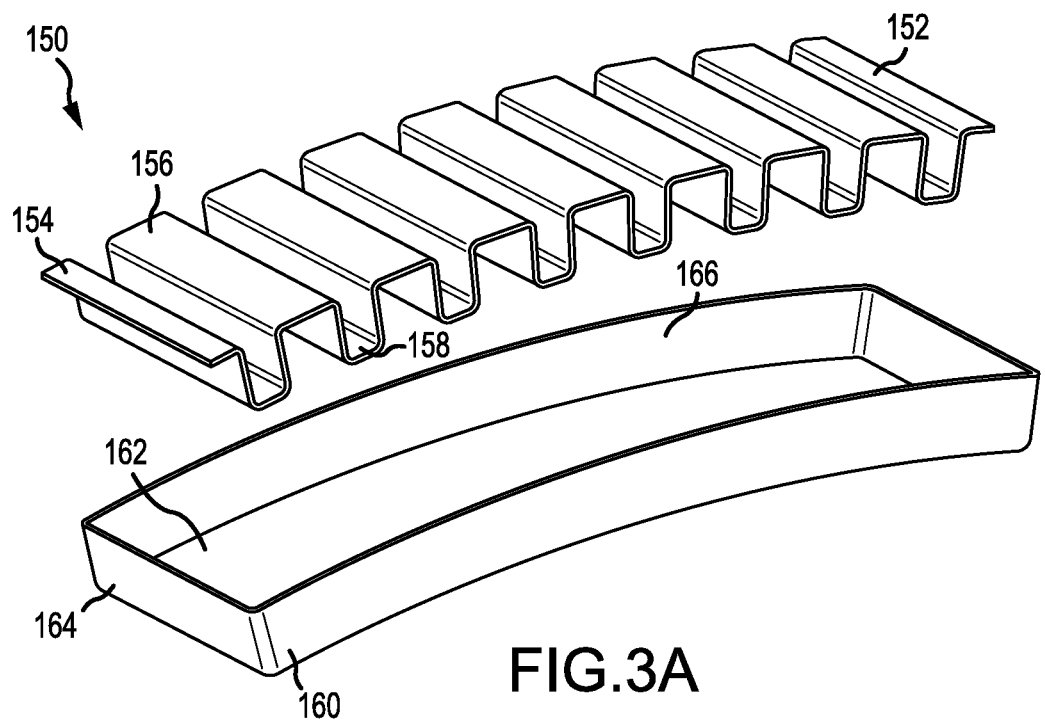
FIG. 3A illustrates an exploded perspective view of an inner shroud segment comprising an outer housing and an inner housing with a terminus wall of the outer housing partially defining a gas path, in accordance with various embodiments.
Figure 3B:
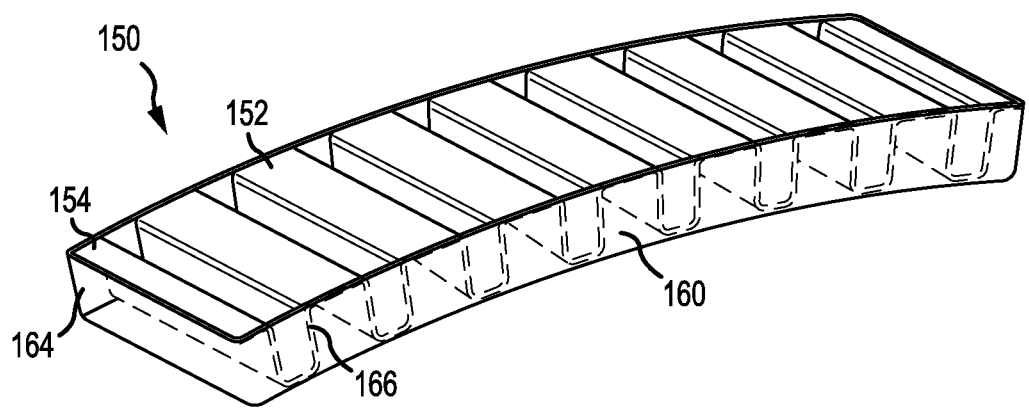
FIG. 3B illustrates a perspective view of an inner shroud segment with an inner housing inserted into an outer housing, in accordance with various embodiments.

Referring now to FIGS. 3A and 3D, inner shroud segment 150 is shown according to various embodiments. Inner shroud segment 150 is similar to inner shroud segment 80 of FIGS. 2A through 2D. Inner shroud segment 150 may have the same configuration as inner shroud segments 80 as viewed along axis A-A' in FIG. 2A. Inner shroud segment 150 includes outer housing 152 having channels 158. Terminus wall 154 of inner shroud segment 150 may align with surface 156 circumferentially. Terminus wall 154 of inner shroud segment 150 differs from terminus wall 126 of FIG. 2D based on the circumferential orientation of terminus wall 154. Inner housing 160 may have radial walls 166 and axial walls 164 defining channel 162.

In various embodiments, outer housing 152 may be inserted into channel 162 of inner housing 160. Terminus wall 154 may contact axial wall 164, and terminus wall 154 and a surface of radial wall 166 being substantially flush to one another. Channels 158 of outer housing 152 may be oriented radially outward and away from inner housing 160.

Inner shrouds of the present disclosure may be low-weight shrouds made using low-cost manufacturing techniques and materials. For example, sheet metal may be manipulated to a desired configuration with a compliant material such as rubber injected into cavities to form the inner shroud. The compliant material such as rubber may be used to couple components of the inner shroud without the need for fasteners, as the rubber compliant material serves to fix the components of the shroud together. The use of sheet metal means that the shroud can be manufactured without milling and/or turning metals.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An inner shroud segment, comprising:
an inner housing having a radial curve centered relative to an axis; wherein the inner housing comprises a first radial wall, a second radial wall, and a bottom wall that define a first channel;
an outer housing disposed within the first channel of the inner housing,
the outer housing having a first axial wall, a first circumferential wall, and a second axial wall, wherein the first circumferential wall is joined orthogonally between the first axial wall and the second axial wall to define a second channel extending orthogonally between the first radial wall and the second radial wall of the inner housing, wherein at least one of the first radial wall or the second radial wall of the inner housing contact at least one of the first axial wall, the first circumferential wall, or the second axial wall; and
a compliant material disposed in the second channel and coupled to the radial wall and at least one of the first axial wall, the first circumferential wall, or the second axial wall.

2. The inner shroud segment of claim 1, wherein the outer housing comprises a third axial wall joined to the second axial wall by an orthogonal wall, wherein the orthogonal wall defines an enclosed cavity bonded by each of the second axial wall and the third axial wall of the outer housing, each of the first radial wall and the second radial wall of the inner housing, and between the orthogonal wall of the outer housing and the bottom wall of the inner housing.

3. The inner shroud segment of claim 2, wherein the compliant material is deposited outside the cavity.

4. The inner shroud segment of claim 1, further comprising a vane extending into the second channel and contacting the compliant material.

5. The inner shroud segment of claim 1, wherein an exposed surface of the compliant material is substantially coplanar with a surface of the outer housing.

6. The inner shroud segment of claim 1, wherein the inner housing comprises a bent sheet of metal.

7. The inner shroud segment of claim 1, wherein the compliant material retains the outer housing in position relative to the inner housing.

8. An inner shroud, comprising:
an inner shroud segment with a radial curve centered about an axis, comprising,
an inner housing, and
an outer housing disposed within the inner housing and defining a channel facing away from the inner housing and an enclosed cavity between outer housing and the inner housing, wherein the channel is filled by a compliant material;
a vane at least partially retained within the channel of the outer housing; and
wherein the compliant material is coupled to the vane, the inner housing, and the outer housing, wherein the compliant material retains the inner housing relative to the outer housing, and
wherein the channel and the cavity extend parallel to the axis.

9. The inner shroud of claim 8, wherein:
the inner housing comprises a first radial wall, a second radial wall, and a bottom wall extending parallel the axis and between the first radial wall and the second radial wall to define a channel of the inner housing; and
the outer housing comprises a first axial wall, a first circumferential wall, and a second axial wall, wherein the first circumferential wall is joined orthogonally between the first axial wall and the second axial wall to define the channel facing away from the inner housing, wherein the outer housing is disposed within the channel of the inner housing to further define the enclosed cavity between the first radial wall and the second radial wall of the inner housing.

10. The inner shroud of claim 8, wherein the compliant material is deposited outside of the cavity.

11. The inner shroud of claim 8, wherein an exposed surface of the compliant material is substantially coplanar with a surface of the outer housing.

12. The inner shroud of claim 8, wherein the inner shroud segment is made from sheet metal.

13. The inner shroud of claim 8, wherein the inner shroud segment is made from a composite material.

14. The inner shroud of claim 8, wherein the inner housing comprises an axial wall in contact with a terminus wall of the outer housing, wherein the terminus wall is coplanar with a surface of the compliant material.

15. The inner shroud of claim 8, wherein the outer housing comprises an terminus wall oriented axially and contacting a bottom wall of the inner housing.

16. A gas turbine engine, comprising:
a compressor section comprising a vane retained in an inner shroud segment, comprising:
an inner housing, and
an outer housing disposed within the inner housing and defining a channel facing away from the inner housing and an enclosed cavity between outer housing and the inner housing, wherein the channel is filled by a compliant material;
a combustor section aft of the compressor section; and
a turbine section aft of the compressor section and coupled to the compressor section by a shaft,
wherein the channel and the cavity extend parallel the shaft.

17. The gas turbine engine of claim 16, wherein:
the inner housing comprises a first radial wall, a second radial wall, and a bottom wall extending parallel the shaft and between the first radial wall and the second radial wall to define a channel of the inner housing; and
the outer housing comprises a first axial wall, a first circumferential wall, and a second axial wall, wherein the first circumferential wall is joined orthogonally between the first axial wall and the second axial wall to define the channel facing away from the inner housing, wherein the outer housing is disposed within the channel of the inner housing to further define the enclosed cavity between the first radial wall and the second radial wall of the inner housing, wherein the first circumferential wall contacts the bottom wall.

18. The gas turbine engine of claim 16, further comprising a compliant material coupled to the inner housing, the outer housing, and the vane.

19. The gas turbine engine of claim 18, wherein an exposed surface of the compliant material is substantially coplanar with a surface of the outer housing.

20. The gas turbine engine of claim 16, wherein the inner shroud segment is made from sheet metal.

* * * * *

UNITED STATES PATENT AND TRADEMARK OFFICE
CERTIFICATE OF CORRECTION

PATENT NO. : 10,557,364 B2
APPLICATION NO. : 15/358858
DATED : February 11, 2020
INVENTOR(S) : Colin Amadon Page 1 of 1

It is certified that error appears in the above-identified patent and that said Letters Patent is hereby corrected as shown below:

Title - please delete "PIECES" and insert therefore --PIECE--

Signed and Sealed this
Sixth Day of October, 2020

Andrei Iancu
*Director of the United States Patent and Trademark Office*